United States Patent
Zhang et al.

(10) Patent No.: US 11,432,211 B2
(45) Date of Patent: Aug. 30, 2022

(54) METHOD AND APPARATUS FOR HANDOVER BETWEEN HETEROGENEOUS NETWORKS

(71) Applicant: Beijing University of Posts and Telecommunications, Beijing (CN)

(72) Inventors: Qixun Zhang, Beijing (CN); Zhiyong Feng, Beijing (CN); Mengyuan Liu, Beijing (CN); Sai Huang, Beijing (CN); Zhiqing Wei, Bijing (CN); Yibo Huan, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 17/267,717

(22) PCT Filed: Sep. 29, 2018

(86) PCT No.: PCT/CN2018/108568
§ 371 (c)(1),
(2) Date: Feb. 10, 2021

(87) PCT Pub. No.: WO2020/029411
PCT Pub. Date: Feb. 13, 2020

(65) Prior Publication Data
US 2021/0352545 A1     Nov. 11, 2021

(30) Foreign Application Priority Data

Aug. 10, 2018 (CN) .......................... 201810914221.8

(51) Int. Cl.
*H04W 36/00* (2009.01)
(52) U.S. Cl.
CPC ............................ *H04W 36/00837* (2018.08)
(58) Field of Classification Search
None
See application file for complete search history.

(56) References Cited

U.S. PATENT DOCUMENTS

| 2004/0078384 A1 | 4/2004 | Keir et al. |
| 2007/0173248 A1* | 7/2007 | Sekhar ............ H04W 36/00837 455/423 |
| 2010/0087195 A1 | 4/2010 | Lu et al. |

FOREIGN PATENT DOCUMENTS

| CN | 103874132 A | 6/2014 |
| CN | 104602325 * | 6/2014 |

(Continued)

OTHER PUBLICATIONS

Chang, Guo "Research on The Key Technologies For Vertical Handover Decision in Heterogeneous Wireless Networks", Thesis Submitted to Nanjing University of Posts and Telecommunications for the Degree of Master of Engineering, Apr. 2015, 59 pages.

*Primary Examiner* — Suhail Khan
(74) *Attorney, Agent, or Firm* — Seed IP Law Group LLP

(57) ABSTRACT

Disclosed are a method and an apparatus for handover between heterogeneous networks. The method comprises: obtaining, for each of a plurality of candidate networks, parameters of the candidate network including a packet loss rate and a network load, and taking the obtained parameters as decision parameters of the candidate network; obtaining each of preset service types and a preset weight factor for at least one user preference corresponding to the preset service type; calculating weights of decision parameters for each preset service type by using the decision parameters of the candidate network and through an Analytic Hierarchy Process, and determining a weight vector for the preset service type; adjusting the weight vector for each preset service type by using the preset weight factor; calculating, using the weight vector and through an intuitionistic trapezoidal fuzzy multi-attribute decision-making algorithm, a score for each of the candidate networks, determining the candidate network with the highest score as a target network, and triggering a handover.

12 Claims, 5 Drawing Sheets

(56) References Cited

FOREIGN PATENT DOCUMENTS

| | | | |
|---|---|---|---|
| CN | 104602325 A | | 5/2015 |
| CN | 104812027 | * | 7/2015 |
| CN | 104812027 A | | 7/2015 |
| CN | 108024307 A | | 5/2018 |

* cited by examiner

METHOD AND APPARATUS FOR HANDOVER BETWEEN HETEROGENEOUS NETWORKS

The present application claims the priority to a Chinese patent application No. 201810914221.8, filed with the China National intellectual Property Administration on Aug. 10, 2018 and entitled "method and apparatus for handover between heterogeneous networks", which is incorporated herein by reference in its entirety.

TECHNICAL FIELD

The application relates to the field of wireless communication technology, and in particular to a method and an apparatus for handover between heterogeneous networks.

BACKGROUND

A heterogeneous network is such a network that is made up of computers, network devices, and systems produced by different manufacturers. "Heterogeneous" means that two or more wireless communication systems adopt different access technologies, or they adopt the same wireless access technology but belong to different wireless operators.

An existing heterogeneous network is composed of networks of multiple wireless access technologies, for example, $3^{rd}$-Generation (3G), $4^{th}$-Generation (4G), Wireless Local Area Networks (WLAN), etc. The coverage and support for mobility vary among these networks of different access technologies. In practice, a user in movement would experience handovers between cells under the same network standard and handovers between different network standards, depending on the types of services required by the user and changes in user policies.

At present, in a typical method for handover between heterogeneous networks, a handover policy depends on a handover decision standard that is determined by various combinations of handover parameters. For example, a handover decision method based on multi-attribute decision mainly includes the following steps.

First, parameters of candidate networks are obtained as decision parameters, and the weight for each of the decision parameters is determined through an entropy method. The decision parameters include: Reference Signal Received Power (RSRP), network delay, bandwidth, service cost, and energy consumption. A utility function is then designed through a simple weighting method to rank the candidate networks. Specifically, a profit function related to the candidate networks is established, and a linearly weighted sum of the decision parameters is calculated. The candidate networks are ranked in terms of their weighted sums, and an optimal network is selected as the decision result for access from the candidate networks in rank. The entropy weight method is an objective weighting method, wherein, according to variation degrees of decision parameters, weights for decision parameters are calculated through an information entropy method. The weights are then corrected to obtain final weights. A smaller entropy value of a decision parameter indicates a larger uncertainty and a larger weight for the decision parameter.

The decision parameters used in a known method for handover between heterogeneous networks, such as RSRP, network delay, bandwidth, service cost, and energy consumption, can directly reflect the network statuses of heterogeneous networks, and among the existing methods for handover between heterogeneous networks, a utility function designed through a simple weighting method is used to rank the candidate networks. This method requires that the importance of one decision parameter is not affected by another decision parameter. However, in practical applications, due to the complex network environment of heterogeneous networks, decision parameters affect each other, and the state of the network changes dynamically, under which circumstance, the existing methods for handover between heterogeneous networks can no longer meet the individual needs of users for the network and related services. This results in degraded user experience.

SUMMARY

The embodiments of the present application provide a method and an apparatus for handover between heterogeneous networks. Handover performance between heterogeneous networks can be improved, so as to meet the personalized needs of users for networks and related services. The specific technical solutions are as follows:

In a first aspect, the embodiment of the present application provides a method for handover between heterogeneous networks, comprising:

obtaining, for each of a plurality of candidate networks, parameters of the candidate network including a packet loss rate and a network load, and taking the obtained parameters as decision parameters of the candidate network;

obtaining each of preset service types and a preset weight factor for at least one user preference corresponding to the preset service type;

calculating, for each preset service type, weights of decision parameters for the preset service type by using the decision parameters of the candidate network and through an Analytic Hierarchy Process, and determining a vector composed of the weights of decision parameters for each preset service type as a weight vector for the preset service type:

adjusting the weight vector for each preset service type by using the preset weight factor for at least one user preference corresponding to the preset service type; and calculating, using the weight vector for each preset service type and through an intuitionistic trapezoidal fuzzy multi-attribute decision-making algorithm, a score for each of the candidate networks, determining the candidate network with the highest score as a target network, and triggering a handover.

Optionally, the operation of calculating, for each preset service type, weights of decision parameters for the preset service type by using the decision parameters of the candidate network and through an Analytic Hierarchy Process, and determining a vector composed of the weights of decision parameters for each preset service type as a weight vector for the preset service type comprises:

selecting two decision parameters from decision parameters for each preset service type each time, and determining relative importance degree between the two selected decision parameters according to a preset scale indicating relative importance degree between decision parameters, and constructing a decision matrix for the preset service type by using the relative importance degree between the two selected decision parameters;

calculating, based on the decision matrix constructed for each preset service type, weights of decision parameters for the preset service type through characteristic root method, and normalizing the weights of decision parameters for the preset service type so as to obtain normalized weights of decision parameters for the preset service type; and constituting the weight vector for each preset service type with normalized weights of decision parameters for the preset service type.

Optionally, the operation of calculating, based on the decision matrix constructed for each preset service type, weights of decision parameters for the preset service type through characteristic root method, and normalizing the weights of decision parameters for the preset service type so as to obtain normalized weights of decision parameters for the preset service type comprises:

calculating, based on the decision matrix constructed for each preset service type, a product $w_i$ of elements in each row of the decision matrix for the preset service type;

obtaining an nth root $\overline{w_i}$ of the product $w_i$ of elements in each row, n represents the number of the decision parameters;

normalizing, through a formula, the nth root $\overline{w_i}$ of the product $w_i$ of elements in each row, and obtaining a normalized weight vector $\omega_i$ of decision parameters for each preset service type; wherein the formula is:

$$\omega_i = \overline{w_i} / \Sigma_{i=1}^{n} \overline{w_i}$$

i representing an ith row of the decision matrix for the preset service type.

Optionally, adjusting the weight vector for each preset service type by using the preset weight factor for at least one user preference corresponding to the preset service type comprises:

for each preset service type, multiplying the preset weight factor for at least one user preference corresponding to the preset service type with a value of a decision parameter in the decision matrix for the preset service type corresponding to the user preference, to update the decision matrix constructed for the preset service type;

calculating, based on the updated decision matrix for each preset service type, updated weights of decision parameters for the preset service type through characteristic root method, and normalizing the updated weights of decision parameters for the preset service type, to obtain normalized weights of decision parameters for the preset service type; and constituting an updated weight vector for each preset service type with normalized weights of decision parameters for each preset service type.

Optionally, the step of the operation of calculating, using the weight vector for each preset service type and through an intuitionistic trapezoidal fuzzy multi-attribute decision-making algorithm, a score for each of the candidate networks, determining the candidate network with the highest score as a target network comprises:

carrying out a fuzzy language appraisal on decision parameters of the candidate networks, converting fuzzy language appraisal information to trapezoidal fuzzy numbers to obtain a fuzzy decision-making matrix;

classifying decision parameters of the candidate networks into: benefit-type decision parameters and cost-type decision parameters, standardizing fuzzy numbers of the benefit-type decision parameters and the cost-type decision parameters in the fuzzy decision-making matrix, to obtain a standardized decision-making matrix;

based on the standardized decision-making matrix and the weight vector for each preset service type obtained through Analytic Hierarchy Process, calculating, using a formula of intuitionistic trapezoidal fuzzy weight averaging operator, an average attribute value of decision parameters for the preset service type; and based on the average attribute value of decision parameters for each preset service type, calculating, through a score function, scores of the candidate networks, ranking the calculated scores of the candidate networks, and determining the candidate network with the highest score as a target network.

Optionally, standardizing fuzzy numbers of the benefit-type decision parameters and the cost-type decision parameters in the fuzzy decision-making matrix, respectively, through a method for standardizing fuzzy numbers of benefit-type decision parameters and a method for standardizing fuzzy numbers of cost-type decision parameters as follows:

the method for standardizing fuzzy numbers of the benefit-type decision parameters is:

$$r_{ij} = \left( \left[ \frac{\max_j(d_{ij}) - d_{ij}}{\max_j(d_{ij}) - \min_j(a_{ij})}, \frac{\max_j(d_{ij}) - c_{ij}}{\max_j(d_{ij}) - \min_j(a_{ij})}, \frac{\max_j(d_{ij}) - b_{ij}}{\max_j(d_{ij}) - \min_j(a_{ij})}, \frac{\max_j(d_{ij}) - a_{ij}}{\max_j(d_{ij}) - \min_j(a_{ij})} \right]; \mu_{ij}, v_{ij} \right)$$

the method for standardizing fuzzy numbers of the cost-type decision parameters is:

$$r_{ij} = \left( \left[ \frac{\max_j(d_{ij}) - d_{ij}}{\max_j(d_{ij}) - \min_j(a_{ij})}, \frac{\max_j(d_{ij}) - c_{ij}}{\max_j(d_{ij}) - \min_j(a_{ij})}, \frac{\max_j(d_{ij}) - b_{ij}}{\max_j(d_{ij}) - \min_j(a_{ij})}, \frac{\max_j(d_{ij}) - a_{ij}}{\max_j(d_{ij}) - \min_j(a_{ij})} \right]; \mu_{ij}, v_{ij} \right),$$

standardizing respectively fuzzy numbers of the benefit-type decision parameters and the cost-type decision parameters in the fuzzy decision-making matrix:

wherein, $r_{ij}$ is an attribute value for a decision parameter in the standardized decision-making matrix obtained by standardizing decision parameters in the fuzzy decision matrix, $a_{ij}$, $b_{ij}$, $c_{ij}$, and $d_{ij}$ are attribute values of a decision parameter corresponding to an ith row and a jth column of the fuzzy decision-making matrix, $\mu_{ij}$ and $v_{ij}$ are respectively a membership degree corresponding to a membership function and a non-membership degree corresponding to a non-membership function of the fuzzy decision-making matrix, i represents an ith row of the fuzzy decision-making matrix, and j represents a jth column of the fuzzy decision-making matrix.

Optionally, the formula of intuitionistic trapezoidal fuzzy weight averaging operator is:

$$ITFWA_a(\tilde{a}_{m1}, \tilde{a}_{m2}, \cdots \tilde{a}_{mn}) = \sum_{k=1}^{n} \tilde{a}_{mk} \omega_k = \left( \left[ \sum_{k=1}^{n} a'_{mk} \omega_k, \sum_{k=1}^{n} b'_{mk} \omega_k, \sum_{k=1}^{n} c'_{mk} \omega_k, \sum_{k=1}^{n} d'_{mk} \omega_k \right]; 1 - \prod_{k=1}^{n} (1 - \mu'_{mk})^{\omega_k}, \prod_{k=1}^{n} v'^{\omega_k}_{mk} \right)$$

wherein, $\omega = (\omega_1, \omega_2, \ldots, \omega_k)^T$ is the weight vector for each preset service type, $\omega_k > 0$, $\Sigma_{k=1}^{n} \omega_k = 1$ $\omega_g$ represents a kth weight in the weight vector for each preset service type, n represents the number of the decision parameters, $a_{mk}'$, $b_{mk}'$, $c_{mk}'$, and $d_{mk}'$ are attribute values of a decision parameter corresponding to a mth row and a kth column of the standardized decision-making matrix, $\mu_{mk}'$ and $v_{mk}'$ are respectively a membership degree corresponding to a membership function and a non-membership degree value corresponding to a non-membership function of the standardized decision-making matrix, and ã represents intuitionistic trapezoidal fuzzy numbers.

Optionally the score function is:

$$S(\tilde{a}) = \frac{1}{4}(p+q+s+g) \times \frac{\mu\tilde{a} - v\tilde{a}}{2}$$

wherein, S(ã) is a score of a candidate network, p, q, s, and g are respectively average attribute values of decision parameters for preset service types, µã and vã are respectively a membership degree and non-membership degree value for the average attribute value of decision parameters for each preset service type, µ, v are respectively a membership degree and non-membership degree for the average attribute value of decision parameters for each preset service type, and a represents an intuitionistic trapezoidal fuzzy number.

Optionally, the preset service types comprise: a conversational service, a streaming service, an interaction service, a background service, and a Machine-to-Machine (M2M) wireless communication service.

In a second aspect, the embodiment of the present application further provides an apparatus for handover between heterogeneous networks, comprising:

a first obtaining module, configured for obtaining, for each of a plurality of candidate networks, parameters of the candidate network including a packet loss rate and a network load, and taking the obtained parameters as decision parameters of the candidate network;

a second obtaining module, configured for obtaining each of preset service types and a preset weight factor for at least one user preference corresponding to the preset service type;

a weight computation module, configured for calculating, for each preset service type, weights of decision parameters for the preset service type by using the decision parameters of the candidate network and through an Analytic Hierarchy Process, and determining a vector composed of the weights of decision parameters for each preset service type as a weight vector for the preset service type;

a weight adjusting module, configured for adjusting the weight vector for each preset service type by using the preset weight factor for at least one user preference corresponding to the preset service type;

a handover determination module, configured for calculating, using the weight vector for each preset service type and through an intuitionistic trapezoidal fuzzy multi-attribute decision-making algorithm, a score for each of the candidate networks, determining the candidate network with the highest score as a target network, and triggering a handover.

In a third aspect, the embodiment of the present application provides an electronic device, including a processor, a communication interface, a memory, and a communication bus, wherein the processor, the communication interface and the memory communicate with each other through the communication bus;

the memory is configured for storing a computer program;

the processor configured for executing the computer program stored in the memory to implement the method for handover between heterogeneous networks of the first aspect mentioned above.

In a fourth aspect, the present application provides a computer-readable storage medium, having stored thereon instructions that, when executed by a computer, cause the processor to implement the method for handover between heterogeneous networks of the first aspect mentioned above.

In a fifth aspect, the embodiment of the present application further provides a computer program product containing instructions that, when executed by a computer, causes the computer to implement the method for handover between heterogeneous networks of the first aspect mentioned above.

As can be seen from the above technical solutions, in the solutions provided by the embodiments of the present application, user preferences, preset service types, and network characteristics including network load, packet loss rate, and other network characteristics are comprehensively considered. Decision parameters for each preset service type are properly weighted through the weight optimization algorithm. Then a handover strategy is formulated through intuitionistic trapezoidal fuzzy multi-attribute decision-making algorithm to select the optimal handover network. In the embodiments of the present application, since user preferences, preset service types, and characteristics of different network characteristics are comprehensively considered, that is, the mutual influence between multiple decision parameters is considered, As a result of the extensive consideration of network characteristic parameters, actual situation can be reflected by the final result of the handover more objectively and accurately, and the handover performance between heterogeneous networks can be improved. Moreover, embodiments of the present application are based on the intuitionistic trapezoidal fuzzy multi-attribute decision-making algorithm to formulate a handover strategy, which may help the users to adjust, when the service types change as the users are moving, handover strategies among a variety of preset service types in time, such that users' individual needs for network and related services can be satisfied.

Obviously, implementing any product or method of the present application does not necessarily need to achieve all the advantages described above simultaneously.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

The present application is further described in detail below with reference to the appended drawings and embodiments, for the purpose of clarifying the objects, technical solutions and advantages of the present application. Obviously, the described embodiments are only some, and not all, of the embodiments of the present application. All other embodiments obtained based on the embodiments of the present application by those skilled in the art without any creative efforts fall into the scope of protection defined by the present application.

To solve the existing technical problems, embodiments of the present application provide a method and an apparatus for handover between heterogeneous networks, so as to improve the handover performance between heterogeneous networks, so as to meet the personalized needs of users for networks and related services.

In the following, a method for handover between heterogeneous networks provided by an embodiment of the present application is first introduced.

At present, with the rapid development of network technology, a variety of new 5$^{th}$ Generation (5G) services such as Augmented Reality (AR), Virtual Reality (VR), 3D/4K HD video have brought new challenges to the network such as large bandwidth, low delay, high capacity, and ultra-reliability. As a result, the existing heterogeneous network consisting of 3G, 4G, WLAN and other wireless access technologies are no longer able to meet the individual needs of users for network and related services.

In order to meet the individual needs on AR/VR and other services for high-speed transmission, the 5$^{th}$ generation New Radio (5G NR) technology based on millimeter wave (mm-Wave) frequency band is introduced in 5G networks. In the embodiment of the present application, a handover method for a complex heterogeneous network including multiple wireless access technologies such as 5G NR, Long Term Evolution (4G LTE), and WLAN is taken as an example for description.

Figure 1:
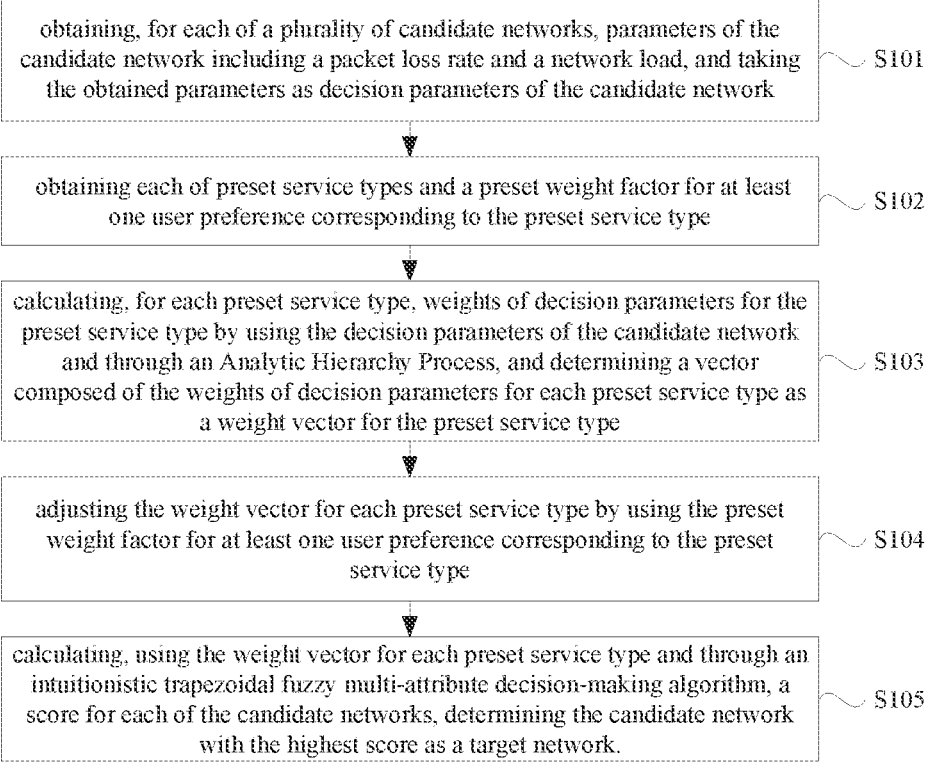
FIG. 1 is a flowchart of a method for handover between heterogeneous networks according to an embodiment of the present application.

As shown in FIG. 1, which is a flowchart of a method for handover between heterogeneous networks according to an embodiment of the present application, the method may comprise:

S101, obtaining, for each of a plurality of candidate networks, parameters of the candidate network including a packet loss rate and a network load, and taking the obtained parameters as decision parameters of the candidate network.

In the embodiment of the present application, for each of a plurality of candidate networks, parameters including a packet loss rate and a network load of the candidate network are first obtained, and the parameters are then taken as decision parameters of the candidate network.

Specifically, the multiple candidate networks in the embodiment of the present application may be 5G NR, 4G LTE, and WLAN networks. The obtained decision parameters of each of the candidate networks may include: received signal strength, network available bandwidth, network delay, network cost, terminal energy consumption, etc.

S102, obtaining each of preset service types and a preset weight factor for at least one user preference corresponding to the preset service type.

Optionally, the preset service types in the embodiment of the present application may include: conversational services, streaming services, interactive services, background services, and Machine-to-Machine (M2M) wireless communication services. The user preferences may include network cost and terminal energy consumption.

For each preset service type required by the user, a preset weight factor for at least one user preference corresponding to the preset service type may be obtained first. The preset weight factor may also be referred to as a weight adjustment factor. Specifically, the value of the preset weight factor for at least one user preference corresponding to each preset service type may be set by a person skilled in the art as required in practice. The application is not limited herein.

At S103, calculating, for each preset service type, weights of decision parameters for the preset service type by using the decision parameters of the candidate network and through an Analytic Hierarchy Process, and determining a vector composed of the weights of decision parameters for each preset service type as a weight vector for the preset service type.

After decision parameters for each of the candidate networks are obtained, for each preset service type required by a user, weights of decision parameters for the preset service type are obtained by using the decision parameters of the candidate network and through an Analytic Hierarchy Process. A vector composed of the weights of decision parameters for each preset service type is determined as a weight vector for the preset service type. Specifically, the process of calculating weights of decision parameters for each preset service type through Analytic Hierarchy Process and determining a weight vector for the preset service type will be described in detail below.

S104, adjusting the weight vector for each preset service type by using the preset weight factor for at least one user preference corresponding to the preset service type.

After the preset weight factor for at least one user preference corresponding to each preset service type is obtained, the weights for the decision parameters corresponding to the user preference in each preset service type can be adjusted by using the obtained preset weight factor. The determined weight vector corresponding to each preset service type is thus adjusted. The specific adjustment method is described in detail below.

S105, calculating, using the weight vector for each preset service type and through an intuitionistic trapezoidal fuzzy multi-attribute decision-making algorithm, a score for each of the candidate networks, determining the candidate network with the highest score as a target network.

For each preset service type required by the user, after weights of decision parameters for the preset service type are calculated by using obtained decision parameters of the candidate network and through an Analytic Hierarchy Process, and the weight vector for each preset service type is adjusted by using the preset weight factor for at least one user preference corresponding to the preset service type, through an intuitionistic trapezoidal fuzzy multi-attribute decision-making algorithm and using the weight vector for each preset service type, scores for the candidate networks is calculated. The candidate network with the highest score is taken as a target network. A handover is triggered. Specifically, the process of calculating, through an intuitionistic trapezoidal fuzzy multi-attribute decision-making algorithm, a score for each of the candidate networks and determining the candidate network with a highest score as a target network will be described in detail below.

In the method for handover between heterogeneous networks as provided by the embodiment of the application, user preferences, preset service types, and network characteristics including network load, packet loss rate, and other network characteristics are comprehensively considered, and reasonable weights for decision parameters corresponding to each preset service type are determined by the weight optimization algorithm. Then a handover strategy is formulated through intuitionistic trapezoidal fuzzy multi-attribute decision-making algorithm to select an optimal handover network. In the embodiments of the present application, since user preferences, preset service types, and characteristics of different network are comprehensively considered, that is, the mutual influence between multiple decision parameters is considered. Further, due to the comprehensive consideration of network characteristic parameters, actual situation can be reflected by the final result of the handover more objectively and accurately. The handover performance between heterogeneous networks can be improved. Moreover, embodiments of the present application are based on the intuitionistic trapezoidal fuzzy multi-attribute decision-making algorithm to formulate a handover strategy. This may help a user to adjust, when the service types change as the user moves, handover strategies among a variety of preset service types in time. Users' individual needs for network and related services can be satisfied.

Figure 2:
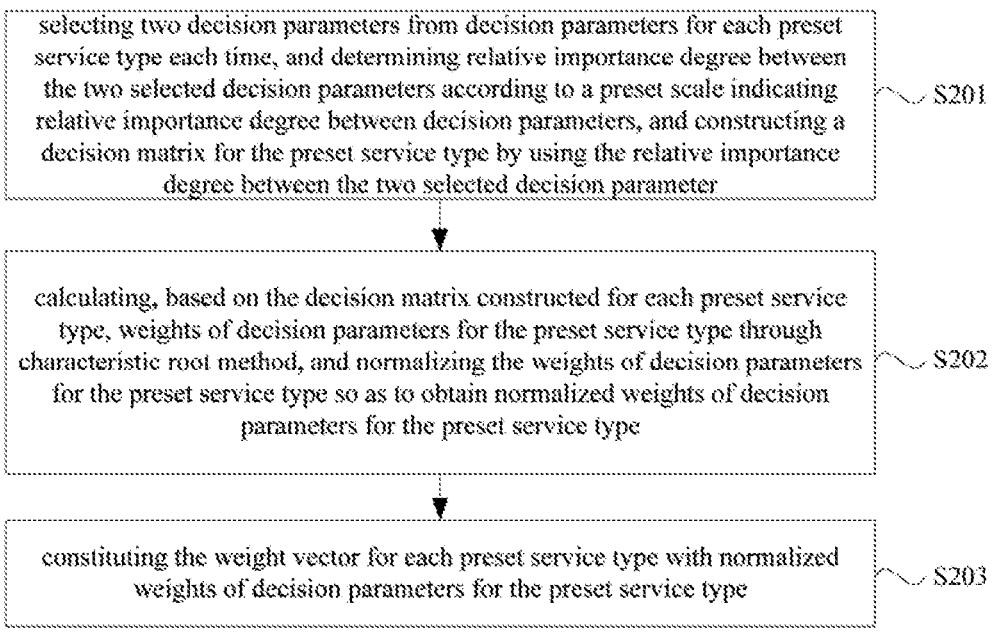
FIG. 2 is a flow chart of an implementation of weight calculation in an embodiment of the present application.

On the basis of the embodiment shown in FIG. 1, as shown in FIG. 2, FIG. 2 is a flow chart of an implementation of weight calculation in an embodiment of the present application, and the implementation may include:

S201, selecting two decision parameters from decision parameters for each preset service type each time, and determining relative importance degree between the two selected decision parameters according to a preset scale indicating relative importance degree between decision parameters, and constructing a decision matrix for the preset service type by using the relative importance degree between the two selected decision parameters.

In one implementation of the embodiment of the present application, weights of decision parameters for each preset service type are calculated through Analytic Hierarchy Process and using obtained decision parameters for the preset service type, and the vector composed of the weights of decision parameters for each preset service type is determined as the weight vector for each preset service type.

Figure 3:
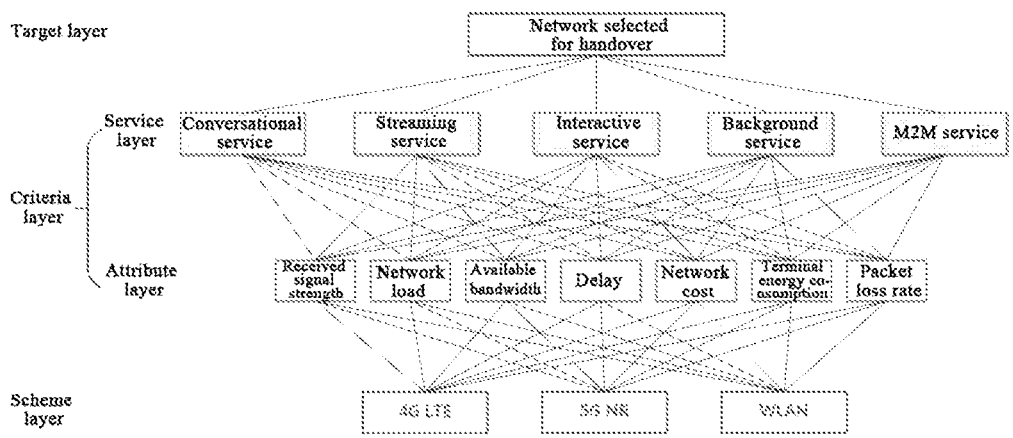
FIG. 3 is a schematic diagram of a hierarchical structure model provided by an embodiment of the present application.

In one optional implementation of the embodiment of the present application, the relationship between the candidate networks, preset service types, and decision parameters are first analyzed to construct a hierarchical structure model of a heterogeneous network. FIG. 3 is a schematic diagram of a hierarchical structure model provided by an embodiment of the present application. In this hierarchical structure model, the highest layer is the target layer (that is, the target network that is ultimately selected for handover), and the intermediate layer comprises a service layer and an attribute layer. The service layer includes services corresponding to preset service types, and the attribute layer includes the decision parameters of each of the candidate networks, and the bottom layer contains different candidate solutions, which are a collection of all candidate networks.

After the hierarchical structure model is constructed, for decision parameters for each preset service type, two decision parameters are selected each time, and the impact of the two selected decision parameters on the target layer of the hierarchical structure model is compared. The relative importance of every two of the decision parameters selected is determined as scale 1-9, and the decision matrix corresponding to each preset service type is constructed.

Exemplarily, a decision matrix constructed for each preset service type may be:

$$H_{matrix} = \begin{array}{c} \\ RSS \\ L \\ B \\ D \\ C \\ P \\ N \end{array} \begin{pmatrix} RSS & L & B & D & C & P & N \\ 1 & h_1 & h_2 & h_3 & h_4 & h_5 & h_6 \\ 1/h_1 & 1 & h_7 & h_8 & h_9 & h_{10} & h_{11} \\ 1/h_2 & 1/h_7 & 1 & h_{12} & h_{13} & h_{14} & h_{15} \\ 1/h_3 & 1/h_8 & 1/h_{12} & 1 & h_{16} & h_{17} & h_{18} \\ 1/h_4 & 1/h_9 & 1/h_{13} & 1/h_{16} & 1 & h_{19} & h_{20} \\ 1/h_5 & 1/h_{10} & 1/h_{14} & 1/h_{17} & 1/h_{19} & 1 & h_{21} \\ 1/h_6 & 1/h_{11} & 1/h_{15} & 1/h_{18} & 1/h_{20} & 1/h_{21} & 1 \end{pmatrix}$$

wherein, $H_{matrix}$ represents the corresponding decision matrix constructed for a preset service type, RSS indicates Received Signal Strength, L represents network load, B represents network available bandwidth, D represents network delay, C represents network cost, P represents terminal energy consumption and N represents packet loss rate. In the decision matrix $H=(h_{ij})_{n \times n}$, $h_{ij}$ represents the relative importance between the decision parameter represented by the ith row and the decision parameter represented by the jth column of the decision matrix, and n is the number of the decision parameters.

Taking the conversational service as an example, the decision matrix of the conversational service may be:

$$H = \begin{array}{c} \\ RSS \\ L \\ B \\ D \\ C \\ P \\ N \end{array} \begin{pmatrix} RSS & L & B & D & C & P & N \\ 1 & 5 & 5 & 1/3 & 8 & 7 & 3 \\ 1/5 & 1 & 1 & 1/7 & 4 & 3 & 1/3 \\ 1/5 & 1 & 1 & 1/7 & 4 & 3 & 1/3 \\ 3 & 7 & 7 & 1 & 9 & 8 & 5 \\ 1/8 & 1/4 & 1/4 & 1/9 & 1 & 1/2 & 1/6 \\ 1/7 & 1/3 & 1/3 & 1/8 & 2 & 1 & 1/5 \\ 1/3 & 3 & 3 & 1/5 & 6 & 5 & 1 \end{pmatrix}$$

S202, calculating, based on the decision matrix constructed for each preset service type, weights of decision parameters for the preset service type through characteristic root method, and normalizing the weights of decision parameters for the preset service type so as to obtain normalized weights of decision parameters for the preset service type.

After the decision matrix for each preset service type is constructed, weights of decision parameters for each preset service type are calculated through characteristic root method based on the constructed decision matrix. Then the weights of decision parameters for each preset service type are normalized to obtain normalized weights of decision parameters for the preset service type. The specific calculation and normalization process are described in detail below.

S203, constituting the weight vector for each preset service type with normalized weights of decision parameters for the preset service type.

Taking the conversational service as an example, the normalized weights of decision parameters for the conversational service are:

$(\omega_1, \omega_2, \ldots, \omega_7) = \{0.2527, 0.0659, 0.0659, 0.4245, 0.0229, 0.0324, 0.1356\}$ wherein, the decision parameters corresponding to $\omega_1, \omega_2, \ldots, \omega_7$ are RSS, L, B, D, C, P, N, respectively.

The same calculation method is used to calculate weights of decision parameters for each preset service type, as shown in Table 1 below, which is the weight value of each of the decision parameters corresponding to each preset service type.

TABLE 1 a weight value of each of the decision parameters corresponding to each preset service type

| Service types | Received signal strength | Load | Bandwidth | Delay | Network cost | Energy consumption | Packet loss rate |
|---|---|---|---|---|---|---|---|
| Conversational service | 0.2527 | 0.0659 | 0.0659 | 0.4245 | 0.0229 | 0.0324 | 0.1356 |
| Streaming service | 0.2085 | 0.1456 | 0.2861 | 0.0758 | 0.0234 | 0.0259 | 0.2347 |
| Interactive service | 0.2449 | 0.1259 | 0.1868 | 0.0779 | 0.0229 | 0.0350 | 0.3064 |
| Background service | 0.2272 | 0.0912 | 0.2486 | 0.0551 | 0.0221 | 0.0346 | 0.3211 |
| M2M service | 0.2881 | 0.0604 | 0.1939 | 0.2929 | 0.0202 | 0.0330 | 0.1114 |

In the embodiments of the present application, weights of decision parameters for each preset service type are calculated through Analytic Hierarchy Process, and a vector composed of the weights of decision parameters for each preset service type is determined as a weight vector for the preset service type. The Analytic Hierarchy Process is a subjective weighting method that can arrange each of the candidate networks, preset service types, and each of the decision parameters into an overall hierarchy of hierarchical structure, and then each of the decision parameters in the hierarchical structure are compared pairwise, the relative importance coefficient of each of the decision parameters is calculated, and the weight is obtained.

Figure 4:
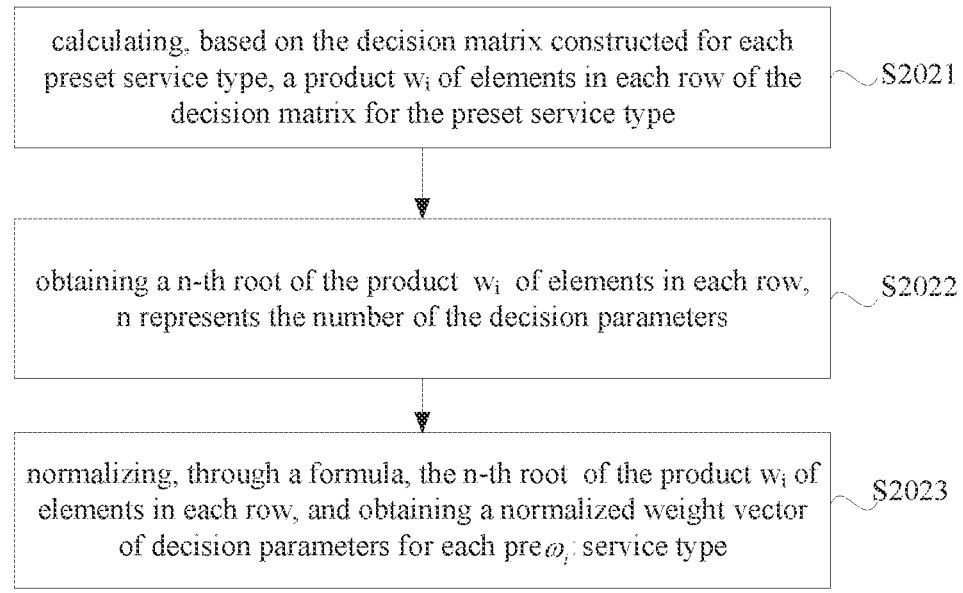
FIG. 4 is a flow chart of an implementation of step S202 in an embodiment shown in FIG. 2.

Further to the embodiment shown in FIG. 2, FIG. 4 is a flow chart of an implementation of step S202 in an embodiment shown in FIG. 2. The implementation may include:

S2021, calculating, based on the decision matrix constructed for each preset service type, a product $w_i$ of elements in each row of the decision matrix for the preset service type.

In the embodiment of the present application, based on the decision matrix constructed for each preset service type, a product $w_i$ of elements in each row of the decision matrix for the preset service type is calculated. Specifically, the formula used to calculate the product $w_i$ of elements in each row of the decision matrix for a preset service type may be:

$$w_i = \prod_{j=1}^{n} h_{ij}$$

Wherein, $i = 1, 2, \ldots, n$, i represents the ith row in the decision matrix for each preset service type, $h_{ij}$ represents the element in the i-row and jth column of the decision matrix, and n is the number of the decision parameters.

S2022, obtaining an nth root $\overline{w}_i$ of the product $w_i$ of elements in each row, n represents the number of the decision parameters.

S2023, normalizing, through a formula, the nth root $\overline{w}_i$ of the product $w_i$ of elements in each row, and obtaining a normalized weight vector $\omega_i$ of decision parameters for each preset service type.

In the embodiment of the present application, after a product $w_i$ of elements in each row of the decision matrix for a preset service type is calculated based on the decision matrix constructed for the preset service type, a nth root $\overline{w}_i$ of the product $w_i$ of elements in each row is obtained. The nth root $\overline{w}_i$ of the product $w_i$ of elements in each row is then normalized through a formula. As such, a normalized weight vector $\omega_i$ of decision parameters for each preset service type is obtained. The formula is:

$$\omega_i = \overline{w}_i / \Sigma_{i=1}^{n} \overline{w}_i$$

Figure 5:
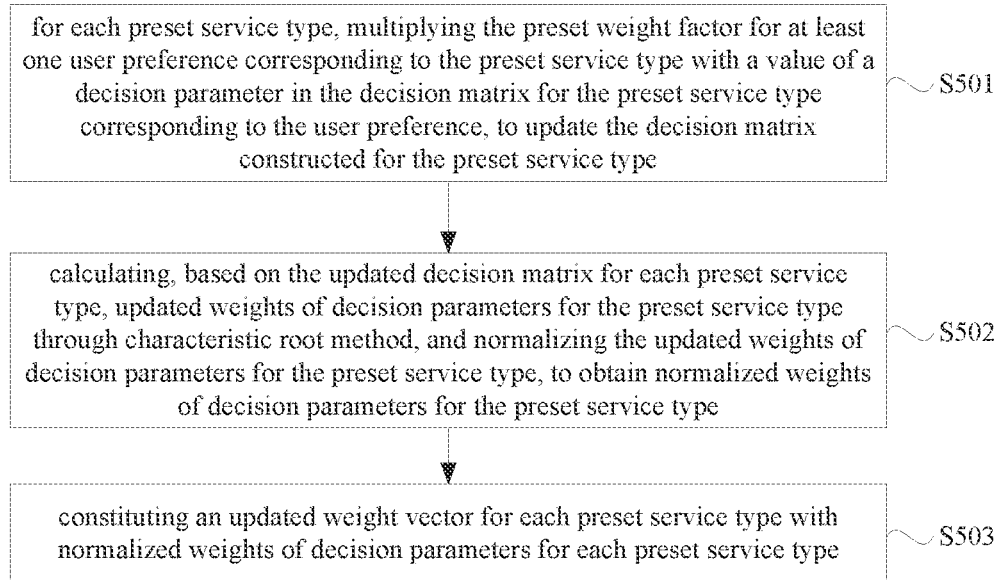
FIG. 5 is a flow chart of an implementation of weight adjustment in an embodiment of the present application.

Further to the embodiment shown in FIG. 2, FIG. 5 is a flow chart of an implementation of weight adjustment in an embodiment of the present application, the implementation may include:

S501, for each preset service type, multiplying the preset weight factor for at least one user preference corresponding to the preset service type with a value of a decision parameter in the decision matrix for the preset service type corresponding to the user preference, to update the decision matrix constructed for the preset service type.

In the embodiment of the present application, after the weight vector for each preset service type is determined, user preferences corresponding to the preset service type are considered. The weight vector for each preset service type is adjusted by using the preset weight factor for at least one user preference corresponding to the preset service type. Specifically, the preset weight factor for at least one user preference corresponding to the preset service type is multiplied with a value of a decision parameter in the decision matrix for the preset service type corresponding to the user preference, to update the relative importance degree of the decision parameter corresponding to the user preference in the decision matrix constructed for preset service type.

Assuming that the user prefers low network overhead (i.e., network cost), the importance of the decision parameter of the network cost in the constructed decision matrix relative to other decision parameters may be somewhat increased, that is, the weight of the network cost is increased. In this way, in a decision for target network handover, the possibility of selecting a candidate network with a low network cost can be avoided. The decision matrix constructed for each preset service type can be updated by following formula:

$$\begin{cases} h'_4 = h_4 * \dfrac{1}{t} \\ h'_9 = h_9 * \dfrac{1}{t} \\ h'_{13} = h_{13} * \dfrac{1}{t} \\ h'_{16} = h_{16} * \dfrac{1}{t} \\ \left(\dfrac{1}{h_{19}}\right)' = \dfrac{1}{h_{19}} * \dfrac{1}{t} \\ \left(\dfrac{1}{h_{20}}\right)' = \dfrac{1}{h_{20}} * \dfrac{1}{t} \end{cases}, \text{ and } t > 1.$$

Wherein, $$h_4, h_9, h_{13}, h_{16}, \dfrac{1}{h_{19}}, \dfrac{1}{h_{20}}$$

are values in the decision matrix constructed for preset service type, and $$h'_4, h'_9, h'_{13}, h'_{16}, \left(\dfrac{1}{h_{19}}\right)', \left(\dfrac{1}{h_{20}}\right)'$$

are the values in the updated the decision matrix corresponding to each preset service type. t is the preset weight factor for at least one user preference preset corresponding to each preset service type. t is a number larger than 1. t can be a decimal number or an integer number. A larger value of t indicates a higher importance of the decision parameter of network cost.

S502, calculating, based on the updated decision matrix for each preset service type, updated weights of decision parameters for the preset service type through characteristic root method, and normalizing the updated weights of decision parameters for the preset service type, to obtain normalized weights of decision parameters for the preset service type.

S503, constituting an updated weight vector for each preset service type with normalized weights of decision parameters for each preset service type.

In the embodiment of the present application, after the decision matrix constructed for each preset service type is updated by using the preset weight factor of at least one user preference corresponding to the preset service type, a characteristic root method is used to calculate updated weights of decision parameters for each preset service type, and the updated weight vector for each preset service type is obtained. This process is not described in detail in the embodiment of the present application and may be referred to the calculation process of the weight in the embodiment shown in FIG. 2 above.

In the embodiments of the present application, the weight vector for each preset service type is adjusted by using the preset weight factor of at least a user preference corresponding to the preset service type, and the user preference is considered in the weight vector for each preset service type. This may reflect the actual situation more objectively and accurately, and further enable the selected target network to match the network characteristics, service types, and user preferences to the greatest extent.

Figure 6:
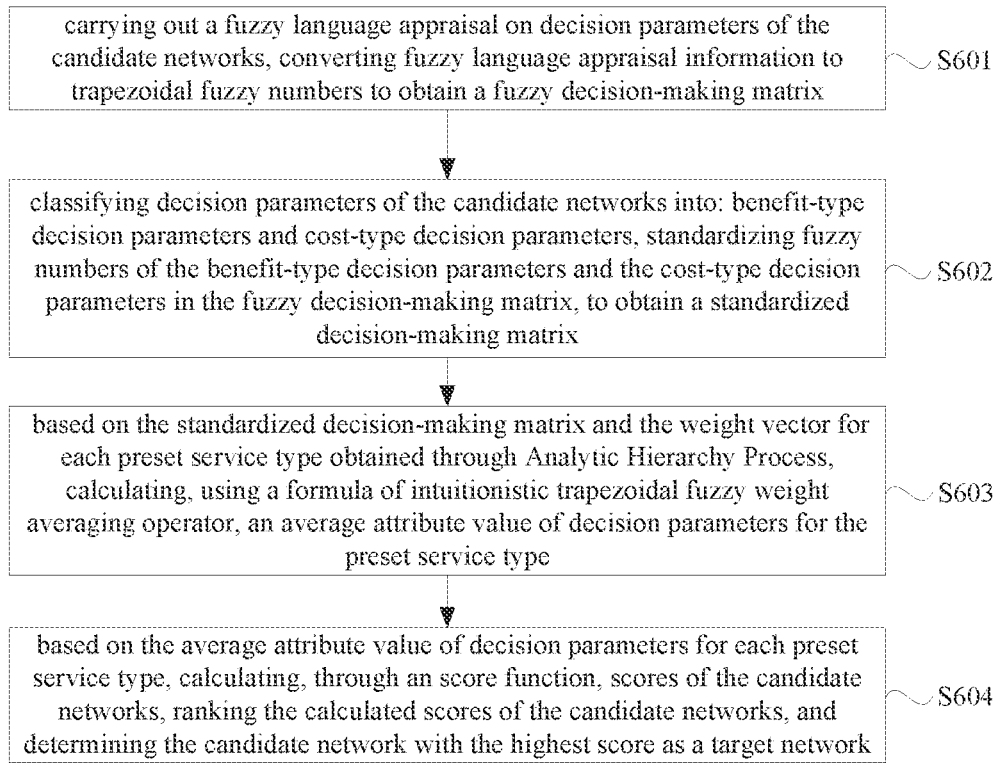
FIG. 6 is a flow chart of an implementation of network handover determination in the embodiment of the application.

On the basis of the embodiment shown in FIG. 1, as shown in FIG. 6, FIG. 6 is a flow chart of an implementation of network handover determination in the embodiment of the application, and the implementation may include.

S601, carrying out a fuzzy language appraisal on decision parameters of the candidate networks, converting fuzzy language appraisal information to trapezoidal fuzzy numbers to obtain a fuzzy decision-making matrix.

In the embodiment of the present application, the decision parameters for each of the candidate networks are appraised with fuzzy language information. The fuzzy language appraisal information is then converted into trapezoidal fuzzy number, and a fuzzy decision-making matrix is further obtained. For a specific conversion method, reference is made to Table 2. Table 2 is the table of mapping the language variable evaluation to the trapezoidal fuzzy number.

TABLE 2 mapping from the language variable evaluation to the trapezoidal fuzzy number

| Language variable evaluation | Trapezoidal fuzzy number |
| --- | --- |
| Very high (VH) | (0.8, 0.9, 0.9, 1) |
| High (H) | (0.6, 0.7, 0.7, 0.8) |
| Medium (M) | (0.4, 0.5, 0.5, 0.6) |
| Low (L) | (0.2, 0.3, 0.3, 0.4) |
| Very low (VL) | (0, 0.1, 0.1, 0.2) |

For example, the candidate networks are: 5G NR, 4G LTE, and WLAN networks, and the obtained fuzzy decision-making matrix can be shown in Table 3 below, which is a table of the fuzzy decision-making matrix.

TABLE 3 a fuzzy decision-making matrix table

| Candidate networks | Decision parameters | | |
| --- | --- | --- | --- |
| | G1 | G2 | G3 |
| LTE | ([0.6, 0.7, 0.7, 0.8]; 0.6, 0.2) | ([0.4, 0.5, 0.5, 0.6]; 0.6, 0.4) | ([0.6, 0.7, 0.7, 0.8]; 0.7, 0.3) |
| WLAN | ([0.4, 0.5, 0.5, 0.6]; 0.6, 0.2) | ([0.6, 0.7, 0.7, 0.8]; 0.6, 0.3) | ([0.4, 0.5, 0.5, 0.6]; 0.7, 0.3) |
| 5G NR | ([0.6, 0.7, 0.7, 0.8]; 0.8, 0.2) | ([0.6, 0.7, 0.7, 0.8]; 0.7, 0.2) | ([0.8, 0.9, 0.9, 1]; 0.9, 0.1) |

| Candidate networks | Decision parameters | | |
| --- | --- | --- | --- |
| | G4 | G5 | G6 |
| LTE | ([0.2, 0.3, 0.3, 0.4]; 0.7, 0.3) | ([0.6, 0.7, 0.7, 0.8]; 0.7, 0.3) | ([0.6, 0.7, 0.7, 0.8]; 0.6, 0.3) |

TABLE 3-continued a fuzzy decision-making matrix table

| | | | |
|---|---|---|---|
| WLAN | ([0, 0.1, 0.1, 0.2]; 0.6, 0.4] | ([0, 0.1, 0.1, 0.2]; 0.9, 0.0) | ([0.2, 0.3, 0.3, 0.4]; 0.7, 0.2) |
| 5G NR | ([0, 0.1, 0.1, 0.2]; 0.9, 0.1) | ([0.6, 0.7, 0.7, 0.8]; 0.6, 0.2) | ([0.4, 0.5, 0.5, 0.6]; 0.6, 0.3) |

| | Decision parameters |
|---|---|
| Candidate networks | G7 |
| LTE | ([0.4, 0.5, 0.5, 0.6]; 0.6, 0.4) |
| WLAN | ([0.2, 0.3, 0.3, 0.4]; 0.6, 0.2) |
| 5G NR | ([0.2, 0.3, 0.3, 0.4]; 0.9, 0.1) |

Wherein, G1 represents received signal strength, G2 represents network load, G3 represents available network bandwidth, G4 represents network delay, G5 represents network cost, G6 represents terminal energy consumption, and G7 represents packet loss rate.

S602, classifying decision parameters of the candidate networks into: benefit-type decision parameters and cost-type decision parameters, standardizing fuzzy numbers of the benefit-type decision parameters and the cost-type decision parameters in the fuzzy decision-making matrix, to obtain a standardized decision-making matrix.

Decision parameters of candidate networks are divided into: benefit-type decision parameters and cost-type decision parameters. Benefit-type decision parameters include: received signal strength and network available bandwidth; while the cost-type decision parameters include: network load, network delay, network cost, terminal energy consumption and packet loss rate. Standardization of the fuzzy number of the benefit-type decision parameters and the cost-type decision parameters in the fuzzy decision-making matrix are respectively carried out to obtain standardized decision-making matrix, wherein the method for standardizing fuzzy number of the benefit-type decision parameters is:

$$r_{ij} = \left\{ \left[ \frac{\max_j(d_{ij}) - d_{ij}}{\max_j(d_{ij}) - \min_j(a_{ij})}, \frac{\max_j(d_{ij}) - c_{ij}}{\max_j(d_{ij}) - \min_j(a_{ij})}, \frac{\max_j(d_{ij}) - b_{ij}}{\max_j(d_{ij}) - \min_j(a_{ij})}, \frac{\max_j(d_{ij}) - a_{ij}}{\max_j(d_{ij}) - \min_j(a_{ij})} \right]; \mu_{ij}, v_{ij} \right\}$$

the method for standardizing fuzzy number of the cost-type decision parameters is:

$$r_{ij} = \left\{ \left[ \frac{\max_j(d_{ij}) - d_{ij}}{\max_j(d_{ij}) - \min_j(a_{ij})}, \frac{\max_j(d_{ij}) - c_{ij}}{\max_j(d_{ij}) - \min_j(a_{ij})}, \frac{\max_j(d_{ij}) - b_{ij}}{\max_j(d_{ij}) - \min_j(a_{ij})}, \frac{\max_j(d_{ij}) - a_{ij}}{\max_j(d_{ij}) - \min_j(a_{ij})} \right]; \mu_{ij}, v_{ij} \right\}$$

wherein, $r_{ij}$ is an attribute value for a decision parameter in the standardized decision-making matrix obtained by standardizing decision parameters in the fuzzy decision matrix, $a_{ij}$, $b_{ij}$, $c_{ij}$, and $d_{ij}$ are attribute values of a decision parameter corresponding to an ith row and a jth column of the fuzzy decision-making matrix, $\mu_{ij}$ and $v_{ij}$ are respectively a membership degree corresponding to a membership function and a non-membership degree corresponding to a non-membership function of the fuzzy decision-making matrix, i represents an ith row of the fuzzy decision-making matrix, and j represents a jth column of the fuzzy decision-making matrix, and $a_{ij} \leq b_{ij} \leq c_{ij} \leq d_{ij}$, $0 \leq \mu_{ij} \leq 1$, $0 \leq v_{ij} \leq 1$, $0 \leq \mu_{ij} + v_{ij} \leq 1$.

Exemplarily, the attribute values of the decision parameters in the foregoing Table 3 may be represented as: the values of $a_{11}$, $b_{11}$, $c_{11}$, $d_{11}$ are respectively 0.6, 0.7, 0.7, 0.8, and the values of $\mu_{11}$ and $v_{11}$ are respectively 0.6 and 0.2. The membership function used in the embodiment of the present application is:

$$\mu\tilde{a}(x) = \begin{cases} \frac{x - a_{ij}}{b_{ij} - a_{ij}} \mu_{ij}\tilde{a}, & a_{ij} \leq x \leq b_{ij}; \\ \mu_{ij}\tilde{a}, & b_{ij} \leq x \leq c_{ij}; \\ \frac{d_{ij} - x}{d_{ij} - c_{ij}} \mu_{ij}\tilde{a}, & c_{ij} \leq x \leq d_{ij}; \\ 0, & \text{other.} \end{cases}$$

The non-membership function used in the embodiment of the present application is:

$$v\tilde{a}(x) = \begin{cases} \frac{(b_{ij} - x) + v_{ij}\tilde{a}(x - a_{ij})}{b_{ij} - a_{ij}}, & a_{ij} \leq x \leq b_{ij}; \\ v_{ij}\tilde{a}, & b_{ij} \leq x \leq c_{ij}; \\ \frac{(x - c_{ij}) + v_{ij}\tilde{a}(d_{ij} - x)}{d_{ij} - c_{ij}}, & c_{ij} \leq x \leq d_{ij}; \\ 0, & \text{other.} \end{cases}$$

wherein, ã is the intuitionistic trapezoidal fuzzy number, $a_{ij}$, $b_{ij}$, $c_{ij}$, $d_{ij}$ are respectively attribute values of the decision parameters corresponding to an ith row and a jth column of the fuzzy decision-making matrix, $\mu_{ij}$, $v_{ij}$ are respectively a membership degree corresponding to a membership function and a non-membership degree value corresponding to a non-membership function of the fuzzy decision-making matrix.

Exemplarily, after standardizing the fuzzy numbers of decision parameters in Table 3 above, the standardized decision-making matrix can be obtained as shown in Table 4 below, and Table 4 is the standardized decision-making matrix table:

TABLE 4 a standardized decision-making matrix table

| Candidate networks | Decision parameters | | |
|---|---|---|---|
| | G1 | G2 | G3 |
| LTE | ([0, 0.25, 0.25, 0.5]; 0.6, 0.2) | ([0, 0.25, 0.25, 0.5]; 0.6, 0.4) | ([0.33, 0.5, 0.5, 0.67]; 0.7, 0.3) |
| WLAN | ([0.5, 0.75, 0.75, 1]; 0.6, 0.2) | ([0.5, 0.75, 0.75, 1]; 0.6, 0.3) | ([0.67, 0.83, 0.83, 1]; 0.7, 0.3) |
| 5G NR | ([0, 0.25, 0.25, 0.5]; 0.8, 0.2) | ([0.5, 0.75, 0.75, 1]; 0.7, 0.2) | ([0, 0.17, 0.17, 0.33]; 0.9, 0.1) |

| Candidate networks | Decision parameters | | |
|---|---|---|---|
| | G4 | G5 | G6 |
| LTE | ([0.5, 0.75, 0.75, 1]; 0.7, 0.3) | ([0.75, 0.875, 0.875, 1]; 0.7, 0.3) | ([0.67, 0.83, 0.83, 1]; 0.6, 0.3) |
| WLAN | ([0, 0.25, 0.25, 0.5]; 0.6, 0.4) | ([0, 0.125, 0.125, 0.25]; 0.9, 0.0) | ([0, 0.17, 0.17, 0.33]; 0.7, 0.2) |
| 5G NR | ([0, 0.25, 0.25, 0.5]; 0.9, 0.1) | ([0.75, 0.875, 0.875, 1]; 0.6, 0.2) | ([0.33, 0.5, 0.5, 0.67]; 0.6, 0.3) |

| Candidate networks | Decision parameters |
|---|---|
| | G7 |
| LTE | ([0.5, 0.75, 0.75, 1]; 0.6, 0.4) |
| WLAN | ([0, 0.25, 0.25, 0.5]; 0.6, 0.2) |
| 5G NR | ([0, 0.25, 0.25, 0.5]; 0.9, 0.1) |

S603, based on the standardized decision-making matrix and the weight vector for each preset service type obtained through Analytic Hierarchy Process, calculating, using a formula of intuitionistic trapezoidal fuzzy weight averaging operator, an average attribute value of decision parameters for the preset service type:

In the embodiment of the present application, after a standardized decision-making matrix is obtained, based on the standardized decision-making matrix and the weight vector for each preset service type obtained through the Analytic Hierarchy Process, an average attribute value of decision parameters for the preset service type is calculated using a formula of intuitionistic trapezoidal fuzzy weight averaging operator. Specifically, the formula of intuitionistic trapezoidal fuzzy weight averaging operator is:

$$ITFWA_\omega(\tilde{a}_{m1}, \tilde{a}_{m2}, \ldots \tilde{a}_{mn}) = \sum_{k=1}^{n} \tilde{a}_{mk}\omega_k = \left( \left[ \sum_{k=1}^{n} a'_{mk}\omega_k, \sum_{k=1}^{n} b'_{mk}\omega_k, \sum_{k=1}^{n} c'_{mk}\omega_k, \sum_{k=1}^{n} d'_{mk}\omega_k \right]; 1 - \prod_{k=1}^{n}(1-\mu'_{mk})^{\omega_1} = \prod_{k=1}^{n} v'_{mk}{}^{\omega_1} \right)$$

wherein, $\omega=(\omega_1, \omega_2, \ldots, \omega_k)^T$ is the weight vector for each preset service type, $\omega_k>0$, $\Sigma_{k=1}^N \omega_k=1$, $\omega_k$ represents a kth weight in the weight vector for each preset service type, n represents the number of the decision parameters, $a_{mk}'$, $b_{mk}'$, $c_{mk}'$, and $d_{mk}'$ are attribute values of a decision parameter corresponding to a mth row and a kth column of the standardized decision-making matrix, $\mu_{mk}'$ and $v_{mk}'$ are respectively a membership degree corresponding to a membership function and a non-membership degree value corresponding to a non-membership function of the standardized decision-making matrix, and a represents intuitionistic trapezoidal fuzzy numbers. $\tilde{a}_{mk}$ is the intuitionistic trapezoidal fuzzy number corresponding to the mth row and kth column in the standardized decision-making matrix, Intuitionistic trapezoidal fuzzy weight averaging operator (ITFWA), in the embodiment of the application, m in the standardized decision-making matrix corresponds to i in the fuzzy decision-making matrix, and has the same value with i; and k in the standardized decision-making matrix corresponds to j in the fuzzy decision-making matrix, and has the same value with j. An attribute value $r_{ij}=([a_{mk}', b_{mk}', c_{mk}', d_{mk}']; \mu_{mk}', v_{mk}')$ of the corresponding decision parameter in the standardized decision-making matrix is obtained by standardizing the decision parameters in the above fuzzy decision-making matrix, wherein, i in $r_{ij}$ corresponds to m in $a_{mk}'$, $b_{mk}'$, $c_{mk}'$, $d_{mk}'$ and has same value with m, j in $r_{ij}$ corresponds to k in $a_{mk}'$, $b_{mk}'$, $c_{mk}'$, $d_{mk}'$ and has the same value with k.

Exemplarily, taking the conversational service as an example, based on the standardized decision-making matrix and the weight vector corresponding to the conversational service through Analytic Hierarchy Process, an average attribute value of the conversational service corresponding to each of the decision parameters calculated by a formula of intuitionistic trapezoidal fuzzy weight averaging operator may be:

$$\tilde{r}_f = ITFWA_\omega(\tilde{r}_{f1}, \tilde{r}_{f2}, \ldots, \tilde{r}_{fn});$$

wherein, $\tilde{r}_f$ represents the average attribute value of decision parameters for the fth candidate network in the standardized decision-making matrix, f corresponds to m in the standardized decision-making matrix, and may have the same value. The calculation result may be represented as: $([a_f'', b_f'', c_f'', d_f'']; \tilde{\mu}_f, \tilde{v}_f)$, wherein $a_f''$, $b_f''$, $c_f''$, $d_f''$ are respectively the average attribute values of decision parameters for the fth candidate network in the standardized decision-making matrix, and $\underline{\mu}_f$, $\underline{\upsilon}_f$ are respectively the membership degree and non-membership degree corresponding to the membership function and non-membership function of the fth candidate network of the standardized decision-making matrix. $\tilde{r}_{f1}, \tilde{r}_{f2}, \ldots, \tilde{r}_{fn}$ are average attribute values of decision parameters corresponding to the fth candidate network in the standardized decision-making matrix, and n is the number of the decision parameters.

The average attribute values of decision parameters for the conversational service are calculated as:

$\tilde{r}_1 = ([0.3407, 0.5796, 0.5796, 0.8189]; 0.6549, 0.2870);$ $\tilde{r}_2 = ([0.2035, 0.4420, 0.4420, 0.6810]; 0.6233, 0.2938);$ $\tilde{r}_3 = ([0.0608, 0.3001, 0.3001, 0.5387]; 0.8617, 0.1313);$ Wherein, $\tilde{r}_1$ is the average attribute value of decision parameters corresponding to the LTE network for the conversational service, $\tilde{r}_2$ is the average attribute value of decision parameters corresponding to the WLAN network for the conversational service, an |$\tilde{r}_3$ is the average attribute value of decision parameters corresponding to the 5G NR network for the conversational service.

S604, based on the average attribute value of decision parameters for each preset service type, calculating, through a score function, scores of the candidate networks, ranking the calculated scores of the candidate networks, and determining the candidate network with the highest score as a target network.

After calculating and obtaining the average attribute value of decision parameters for each preset service type, scores of candidate networks are calculated through a score function. The calculated scores of candidate networks are ranked. The candidate network with a highest score is determined as a target network. The score function formula used is:

$$S(\tilde{a}) = \frac{1}{4}(p + q + s + g) \times \frac{\mu \tilde{a} - \upsilon \tilde{a}}{2}$$

wherein, $S(\tilde{a})$ is a score of a candidate network, p, q, s, and g are respectively average attribute values of decision parameters for preset service types, $\mu \tilde{a}$ and $\upsilon \tilde{a}$ are respectively a membership degree and non-membership degree value for the average attribute value of decision parameters for each preset service type, p, v are respectively a membership degree and non-membership degree for the average attribute value of decision parameters for each preset service type, and $\tilde{a}$ represents an intuitionistic trapezoidal fuzzy number.

Exemplarily, taking a conversational service as an example, based on the calculated average attribute values of decision parameters for the conversational service, the scores of the candidate networks are obtained as: $S(\tilde{r}_1) = 0.10663$, $S(\tilde{r}_2) = 0.07283$, $S(\tilde{r}_3) = 0.10952$, wherein $S(\tilde{r}_1)$ represents the score of the LTE network. $S(\tilde{r}_2)$ represents the score of WLAN network, $S(\tilde{r}_3)$ represents the score of the 5G NR network. They are ranked as: $|S(\tilde{r}_3) > S(\tilde{r}_1) > S(\tilde{r}_2)$, so the candidate network with the highest score, that is, the 5G NR network, is determined as the target network.

In the method for handover between heterogeneous networks as provided by the embodiment of the application, user preferences, preset service types, and network characteristics including network load, packet loss rate, and other network characteristics are comprehensively considered. Decision parameters for each preset service type are properly weighted through the weight optimization algorithm. Then a handover strategy is formulated through intuitionistic trapezoidal fuzzy multi-attribute decision-making algorithm to select the optimal handover network. In the embodiments of the present application, since user preferences, preset service types, and characteristics of different network characteristics are comprehensively considered, that is, the mutual influence between multiple decision parameters is considered, As a result of the extensive consideration of network characteristic parameters, actual situation can be reflected by the final result of the handover more objectively and accurately, and the handover performance between heterogeneous networks can be improved. Moreover, embodiments of the present application are based on the intuitionistic trapezoidal fuzzy multi-attribute decision-making algorithm to formulate a handover strategy, which may help the users to adjust, when the service types change as the users are moving, handover strategies among a variety of preset service types in time, such that users' individual needs for network and related services can be satisfied.

Figure 7:
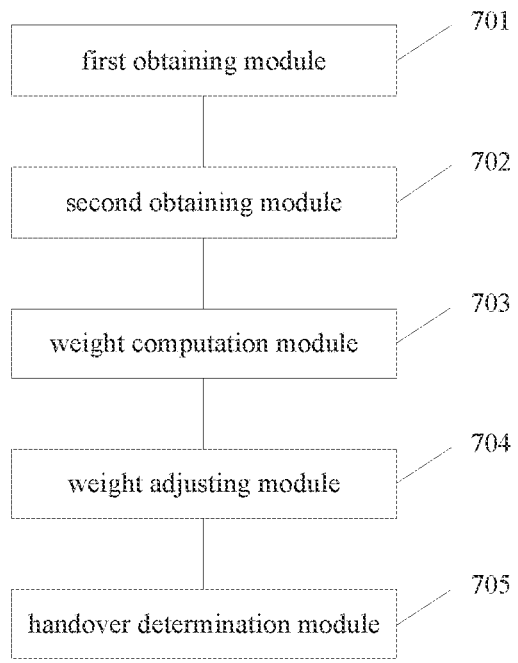
FIG. 7 is a structural diagram of an apparatus for handover between heterogeneous networks provided by the embodiment of the present application.

Corresponding to the foregoing method embodiment, the embodiment of the present application provides an apparatus for handover between heterogeneous networks. As shown in FIG. 7, the apparatus may include:

a first obtaining module 701, configured for obtaining, for each of a plurality of candidate networks, parameters of the candidate network including a packet loss rate and a network load, and taking the obtained parameters as decision parameters of the candidate network:

a second obtaining module 702, configured for obtaining each of preset service types and a preset weight factor for at least one user preference corresponding to the preset service type;

a weight computation module 703, configured for calculating, for each preset service type, weights of decision parameters for the preset service type by using the decision parameters of the candidate network and through an Analytic Hierarchy Process, and determining a vector composed of the weights of decision parameters for each preset service type as a weight vector for the preset service type;

a weight adjusting module 704, configured for adjusting the weight vector for each preset service type by using the preset weight factor for at least one user preference corresponding to the preset service type;

a handover determination module 705, configured for calculating, using the weight vector for each preset service type and through an intuitionistic trapezoidal fuzzy multi-attribute decision-making algorithm, a score for each of the candidate networks, determining the candidate network with the highest score as a target network, and triggering a handover.

With the apparatus for handover between heterogeneous networks as provided by the embodiment of the application, user preferences, preset service types, and network characteristics including network load, packet loss rate, and other network characteristics are comprehensively considered. Decision parameters for each preset service type are properly weighted through the weight optimization algorithm. Then a handover strategy is formulated through intuitionistic trapezoidal fuzzy multi-attribute decision-making algorithm to select the optimal handover network. In the embodiments of the present application, since user preferences, preset service types, and characteristics of different network characteristics are comprehensively considered, that is, the mutual influence between multiple decision parameters is considered, As a result of the extensive consideration of network characteristic parameters, actual situation can be reflected by the final result of the handover more objectively and accurately, and the handover performance between heterogeneous networks can be improved. Moreover, embodiments of the present application are based on the intuitionistic trapezoidal fuzzy multi-attribute decision-making algorithm to formulate a handover strategy, which may help the users to adjust, when the service types change as the users are moving, handover strategies among a variety of preset service types in time, such that users' individual needs for network and related services can be satisfied.

It should be noted that the apparatus in the embodiment of the present application is an apparatus corresponding to the apparatus for handover between heterogeneous networks shown in FIG. 1, and all the embodiments of the method for handover between heterogeneous networks shown in FIG. 1 are applicable to the apparatus, and can achieve the same beneficial effects.

Optionally, the weight calculation module includes:

a construction submodule, configured for selecting two decision parameters from decision parameters for each preset service type each time, and determining relative importance degree between the two selected decision parameters according to a preset scale indicating relative importance degree between decision parameters, and constructing a decision matrix for the preset service type by using the relative importance degree between the two selected decision parameters;

a first calculation submodule, configured for calculating, based on the decision matrix constructed for each preset service type, weights of decision parameters for the preset service type through characteristic root method, and normalizing the weights of decision parameters for the preset service type so as to obtain normalized weights of decision parameters for the preset service type;

a first constituting submodule, configured for constituting the weight vector for each preset service type with normalized weights of decision parameters for the preset service type.

Optionally, the first calculation submodule includes:

a second calculation submodule, configured for calculating, based on the decision matrix constructed for each preset service type, a product $w_i$ of elements in each row of the decision matrix for the preset service type;

a third calculation submodule, configured for obtaining an nth root $\overline{w}_i$ of the product $w_i$ of elements in each row, n represents the number of the decision parameters;

a forth calculation submodule, configured for normalizing, through a formula, the nth root $\overline{w}_i$ of the product $w_i$ of elements in each row, and obtaining a normalized weight vector $\omega_i$ of decision parameters for each preset service type; wherein the formula is:

$$\omega_i = \overline{w}_i / \Sigma_{i=1}^n \overline{w}_i$$

i representing an ith row of the decision matrix for the preset service type.

Optionally, the weight adjustment module includes:

an updating submodule, configured for, for each preset service type, multiplying the preset weight factor for at least one user preference corresponding to the preset service type with a value of a decision parameter in the decision matrix for the preset service type corresponding to the user preference, to update the decision matrix constructed for the preset service type;

a fifth calculation submodule, configured for calculating, based on the updated decision matrix for each preset service type, updated weights of decision parameters for the preset service type through characteristic root method, and normalizing the updated weights of decision parameters for the preset service type, to obtain normalized weights of decision parameters for the preset service type;

a second constituting submodule, configured for constituting an updated weight vector for each preset service type with normalized weights of decision parameters for each preset service type.

Optionally, the handover determination module includes:

a first conversion submodule, configured for carrying out a fuzzy language appraisal on decision parameters of the candidate networks, converting fuzzy language appraisal information to trapezoidal fuzzy numbers to obtain a fuzzy decision-making matrix;

a second conversion submodule, configured for classifying decision parameters of the candidate networks into: benefit-type decision parameters and cost-type decision parameters, standardizing fuzzy numbers of the benefit-type decision parameters and the cost-type decision parameters in the fuzzy decision-making matrix, to obtain a standardized decision-making matrix:

a sixth calculation submodule, configured for based on the standardized decision-making matrix and the weight vector for each preset service type obtained through Analytic Hierarchy Process, calculating, using a formula of intuitionistic trapezoidal fuzzy weight averaging operator, an average attribute value of decision parameters for the preset service type;

a handover determination submodule, configured for based on the average attribute value of decision parameters for each preset service type, calculating, through an score function, scores of the candidate networks, ranking the calculated scores of the candidate networks, and determining the candidate network with the highest score as a target network.

Optionally, the step of standardizing fuzzy numbers of the benefit-type decision parameters and the cost-type decision parameters in the fuzzy decision-making matrix, respectively, though a method for standardizing fuzzy number of benefit-type decision parameters and a method for standardizing fuzzy number of cost-type decision parameters is as follows:

the method for standardizing fizzy number of the benefit-type decision parameters is:

$$r_{ij} = \left\{ \left[ \frac{\max_j(d_{ij}) - d_{ij}}{\max_j(d_{ij}) - \min_j(a_{ij})}, \frac{\max_j(d_{ij}) - c_{ij}}{\max_j(d_{ij}) - \min_j(a_{ij})}, \frac{\max_j(d_{ij}) - b_{ij}}{\max_j(d_{ij}) - \min_j(a_{ij})}, \frac{\max_j(d_{ij}) - a_{ij}}{\max_j(d_{ij}) - \min_j(a_{ij})} \right]; \mu_{ij}, v_{ij} \right\}$$

the method for standardizing fuzzy number of the cost-type decision parameters is:

$$r_{ij} = \left\{ \left[ \frac{\max_j(d_{ij}) - d_{ij}}{\max_j(d_{ij}) - \min_j(a_{ij})}, \frac{\max_j(d_{ij}) - c_{ij}}{\max_j(d_{ij}) - \min_j(a_{ij})}, \frac{\max_j(d_{ij}) - b_{ij}}{\max_j(d_{ij}) - \min_j(a_{ij})}, \frac{\max_j(d_{ij}) - a_{ij}}{\max_j(d_{ij}) - \min_j(a_{ij})} \right]; \mu_{ij}, v_{ij} \right\},$$

standardizing respectively fuzzy numbers of the benefit-type decision parameters and the cost-type decision parameters in the fuzzy decision-making matrix;

wherein, $r_{ij}$ is an attribute value for a decision parameter in the standardized decision-making matrix obtained by standardizing decision parameters in the fuzzy decision matrix, $a_{ij}$, $b_{ij}$, $c_{ij}$, and $d_{ij}$ are attribute values of a decision parameter corresponding to an ith row and a jth column of the fuzzy decision-making matrix, $\mu_{ij}$ and $v_{ij}$ are respectively a membership degree corresponding to a membership function and a non-membership degree corresponding to a non-membership function of the fuzzy decision-making matrix, i represents an ith row of the fuzzy decision-making matrix, and j represents a jth column of the fuzzy decision-making matrix.

Optionally, the formula of intuitionistic trapezoidal fuzzy weight averaging operator is:

$$ITFWA_\omega(\tilde{a}_{m1}, \tilde{a}_{m2}, \ldots \tilde{a}_{mn}) =$$
$$\sum_{k=1}^n \tilde{a}_{mk}\omega_k = \left(\left[\sum_{k=1}^n a'_{mk}\omega_k, \sum_{k=1}^n b'_{mk}\omega_k, \sum_{k=1}^n c'_{mk}\omega_k,\right.\right.$$
$$\left.\left.\sum_{k=1}^n d'_{mk}\omega_k\right]; 1 - \prod_{k=1}^n (1 - \mu'_{mk})^{\omega_2} = \prod_{k=1}^n v'_{mk}{}^{\omega_3}\right)$$

wherein, $\omega=(\omega_1, \omega_2, \ldots, \omega_k)^T$ is the weight vector for each preset service type, $\omega_k>0$, $\Sigma_{k=1}^n \omega_k=1$ $\omega_k$ represents a kth weight in the weight vector for each preset service type, n represents the number of the decision parameters, $a_{mk}'$, $b_{mk}'$, $c_{mk}'$, and $d_{mk}'$ are attribute values of a decision parameter corresponding to a mth row and a kth column of the standardized decision-making matrix, P and v are respectively a membership degree corresponding to a membership function and a non-membership degree value corresponding to a non-membership function of the standardized decision-making matrix, and ã represents intuitionistic trapezoidal fuzzy numbers.

Optionally, the score function is:

$$S(\tilde{a}) = \frac{1}{4}(p+q+s+g) \times \frac{\mu\tilde{a} - v\tilde{a}}{2}$$

wherein, S(ã) is a score of a candidate network, p, q, s, and g are respectively average attribute values of decision parameters for preset service types, μã and vã are respectively a membership degree and non-membership degree value for the average attribute value of decision parameters for each preset service type, μ, v are respectively a membership degree and non-membership degree for the average attribute value of decision parameters for each preset service type, and ã represents an intuitionistic trapezoidal fuzzy number.

Optionally, the preset service types comprise: a conversational service, a streaming service, an interaction service, a background service, and a Machine-to-Machine (M2M) wireless communication service.

Figure 8:
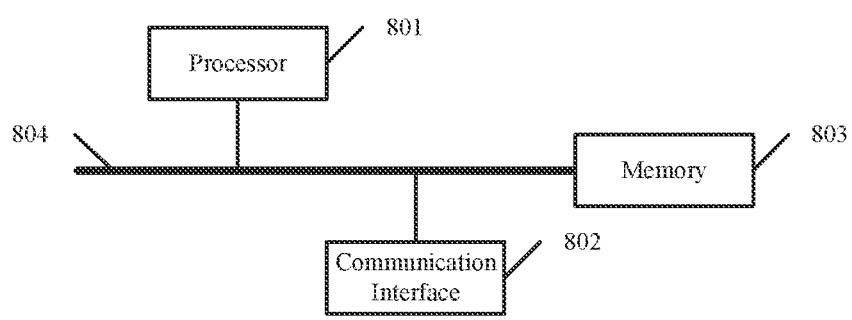
FIG. 8 is a schematic structural diagram of an electronic device provided by an embodiment of the present application.

The embodiments of the present application further provide an electronic device, as shown in FIG. 8, including a processor 801, a communication interface 801, a memory 803, and a communication bus 804, wherein the processor 801, the communication interface 802 and the memory 803 communicate with each other through the communication bus 804;

the memory 803 configured for storing a computer program;

the processor 801 is configured for implementing the steps of data reconstruction method provided by the embodiment of the present application when executing the program stored in the memory 803.

In the solutions provided by the embodiments of the present application, user preferences, preset service types, and network characteristics including network load, packet loss rate, and other network characteristics are comprehensively considered. Decision parameters for each preset service type are properly weighted through the weight optimization algorithm. Then a handover strategy is formulated through intuitionistic trapezoidal fuzzy multi-attribute decision-making algorithm to select the optimal handover network. In the embodiments of the present application, since user preferences, preset service types, and characteristics of different network characteristics are comprehensively considered, that is, the mutual influence between multiple decision parameters is considered, As a result of the extensive consideration of network characteristic parameters, actual situation can be reflected by the final result of the handover more objectively and accurately, and the handover performance between heterogeneous networks can be improved. Moreover, embodiments of the present application are based on the intuitionistic trapezoidal fuzzy multi-attribute decision-making algorithm to formulate a handover strategy, which may help the users to adjust, when the service types change as the users are moving, handover strategies among a variety of preset service types in time, such that users' individual needs for network and related services can be satisfied.

The communication bus in the above electronic device may be a Peripheral Component Interconnect (PCI) bus or an Extended Industry Standard Architecture (EISA) bus and the like. The communication bus may include an address bus, a data bus, a control bus, and the like. For ease of presentation, the communication bus is denoted by a thick line in the drawings. However, this does not mean that there is only one bus or one type of bus.

The communication interface is used for communication between the above electronic device and other devices.

The memory may be a Random Access Memory (RAM) or a Non-Volatile Memory (NVM). At least one disk storage may also be included in the device. Optionally, the memory may also be at least one storage device remote from the aforementioned processor.

The above processor may be a general-purpose processor, such as a Central Processing Unit (CPU) or a Network Processor (NP); or a Digital Signal Processing (DSP) device, an Application Specific Integrated Circuit (ASIC), a Field-Programmable Gate Array (FPGA) or other programmable logic device, discrete gate or transistor logic device, discrete hardware component.

A further embodiment according to the present application further provides a computer-readable storage medium, having stored thereon instructions that, when executed by a computer, cause the computer to implement any of the methods for handover between heterogeneous networks of the embodiments mentioned above to realize the same technical effect.

A further embodiment according to the present application provides a computer program product containing instructions that, when executed on a computer, causes the computer to perform any of the methods for handover between heterogeneous networks of the embodiments mentioned above to realize the same technical effect.

Above embodiments may be fully or partially embodied in software, hardware, firmware, or any combination thereof. When implemented by software, all or part of the embodiments may be implemented in the form of a computer program product. The computer program product includes one or more computer instructions. When the computer program instructions are loaded and executed on a computer, the procedures or functions described in accordance with the embodiments of the present application will take place in whole or in part. The computer may be a general purpose computer, a special purpose computer, a network of computers, or other programmable device. The computer instructions may be stored in a computer-readable storage medium or transmitted from one computer-readable storage medium to another computer-readable storage medium, for example, the computer instructions may be transmitted from one website, computer, server, or data center to another website, computer, server, or data center via wired (e.g., coaxial cable, fiber optic, Digital Subscriber Line (DSL)) or wireless (e.g., infrared, wireless, microwave, etc.) means. The computer-readable storage medium may be any usable medium that can be accessed by a computer or a data storage device, such as an integrated server, an integrated data center, etc., that includes one or more usable media. The usable media may be a magnetic media (e.g., floppy Disk, hard Disk, magnetic tape), an optical media (e.g., DVD), or a semiconductor media (e.g., Solid State Disk (SSD)), among others.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

Each embodiment in this specification is described in a related manner, and the same or similar parts between the various embodiments can be referred to each other. Each embodiment focuses on the differences from other embodiments. In particular, as for embodiments of electronic device, readable storage medium and computer program product, since they are basically similar to the method embodiment, the description is relatively simple, and the relevant part may refer to the description of the method embodiment.

The above descriptions are merely preferred embodiments of the present application, and are not intended to limit the protection scope of the present application. Any modification, equivalent replacement, and improvement made within the spirit and principle of this application fall within the protection scope of this application.

What is claimed is:

1. A method for handover between heterogeneous networks, comprising:
    obtaining, for each of a plurality of candidate networks, parameters of the candidate network including a packet loss rate and a network load, and taking the obtained parameters as decision parameters of the candidate network;
    obtaining each of preset service types and a preset weight factor for at least one user preference corresponding to the preset service type;
    calculating, for each preset service type, weights of decision parameters for the preset service type by using the decision parameters of the candidate network and through an Analytic Hierarchy Process, and determining a vector composed of the weights of decision parameters for each preset service type as a weight vector for the preset service type;
    adjusting the weight vector for each preset service type by using the preset weight factor for at least one user preference corresponding to the preset service type; and
    calculating, using the weight vector for each preset service type and through an intuitionistic trapezoidal fuzzy multi-attribute decision-making algorithm, a score for each of the candidate networks, determining the candidate network with the highest score as a target network, and triggering a handover.

2. The method according to claim 1, wherein the operation of calculating, for each preset service type, weights of decision parameters for the preset service type by using the decision parameters of the candidate network and through an Analytic Hierarchy Process, and determining a vector composed of the weights of decision parameters for each preset service type as a weight vector for the preset service type comprises:
    selecting two decision parameters from decision parameters for each preset service type each time, and determining relative importance degree between the two selected decision parameters according to a preset scale indicating relative importance degree between decision parameters, and constructing a decision matrix for the preset service type by using the relative importance degree between the two selected decision parameters;
    calculating, based on the decision matrix constructed for each preset service type, weights of decision parameters for the preset service type through a characteristic root method, and normalizing the weights of decision parameters for the preset service type so as to obtain normalized weights of decision parameters for the preset service type; and
    constituting the weight vector for each preset service type with normalized weights of decision parameters for the preset service type.

3. The method according to claim 2, wherein the operation of calculating, based on the decision matrix constructed for each preset service type, weights of decision parameters for the preset service type through the characteristic root method, and normalizing the weights of decision parameters for the preset service type so as to obtain normalized weights of decision parameters for the preset service type comprises:
    calculating, based on the decision matrix constructed for each preset service type, a product $w_i$ of elements in each row of the decision matrix for the preset service type;
    obtaining an nth root $\overline{w}_i$, of the product $w_i$ of elements in each row, n represents the number of the decision parameters; and
    normalizing, through a formula, the nth root $\overline{w}_i$, of the product $w_i$ of elements in each row, and obtaining a normalized weight vector $\omega_i$, of decision parameters for each preset service type;

wherein the formula is:

$$\omega_i = \overline{w_i} / \Sigma_{i=1}^n \overline{w_i}$$

i representing an ith row of the decision matrix for the preset service type.

4. The method according to claim 2, wherein adjusting the weight vector for each preset service type by using the preset weight factor for at least one user preference corresponding to the preset service type comprises:

for each preset service type, multiplying the preset weight factor for at least one user preference corresponding to the preset service type with a value of a decision parameter in the decision matrix for the preset service type corresponding to the user preference, to update the decision matrix constructed for the preset service type;

calculating, based on the updated decision matrix for each preset service type, updated weights of decision parameters for the preset service type through the characteristic root method, and normalizing the updated weights of decision parameters for the preset service type, to obtain normalized weights of decision parameters for the preset service type; and constituting an updated weight vector for each preset service type with normalized weights of decision parameters for each preset service type.

5. The method according to claim 1, wherein the operation of calculating, using the weight vector for each preset service type and through an intuitionistic trapezoidal fuzzy multi-attribute decision-making algorithm, a score for each of the candidate networks, and determining the candidate network with the highest score as a target network comprises:

carrying out a fuzzy language appraisal on decision parameters of the candidate networks, converting fuzzy language appraisal information to trapezoidal fuzzy numbers to obtain a fuzzy decision-making matrix;

classifying decision parameters of the candidate networks into: benefit-type decision parameters and cost-type decision parameters, and standardizing fuzzy numbers of the benefit-type decision parameters and the cost-type decision parameters in the fuzzy decision-making matrix, to obtain a standardized decision-making matrix;

based on the standardized decision-making matrix and the weight vector for each preset service type obtained through Analytic Hierarchy Process, calculating, using a formula of intuitionistic trapezoidal fuzzy weight averaging operator, an average attribute value of decision parameters for the preset service type; and based on the average attribute value of decision parameters for each preset service type, calculating, through a score function, scores of the candidate networks, ranking the calculated scores of the candidate networks, and determining the candidate network with the highest score as a target network.

6. The method according to claim 5, wherein standardizing fuzzy numbers of the benefit-type decision parameters and the cost-type decision parameters in the fuzzy decision-making matrix, respectively, through a method for standardizing fuzzy numbers of benefit-type decision parameters and a method for standardizing fuzzy numbers of cost-type decision parameters as follows:

the method for standardizing fuzzy number of the benefit-type decision parameters is:

$$r_{ij} = \left( \left[ \frac{\max_j(d_{ij}) - d_{ij}}{\max_j(d_{ij}) - \min_j(a_{ij})}, \frac{\max_j(d_{ij}) - c_{ij}}{\max_j(d_{ij}) - \min_j(a_{ij})}, \right. \right.$$
$$\left. \left. \frac{\max_j(d_{ij}) - b_{ij}}{\max_j(d_{ij}) - \min_j(a_{ij})}, \frac{\max_j(d_{ij}) - a_{ij}}{\max_j(d_{ij}) - \min_j(a_{ij})} \right]; \mu_{ij}, v_{ij} \right)$$

the method for standardizing fuzzy numbers of the cost-type decision parameters is:

$$r_{ij} = \left( \left[ \frac{\max_j(d_{ij}) - d_{ij}}{\max_j(d_{ij}) - \min_j(a_{ij})}, \frac{\max_j(d_{ij}) - c_{ij}}{\max_j(d_{ij}) - \min_j(a_{ij})}, \right. \right.$$
$$\left. \left. \frac{\max_j(d_{ij}) - b_{ij}}{\max_j(d_{ij}) - \min_j(a_{ij})}, \frac{\max_j(d_{ij}) - a_{ij}}{\max_j(d_{ij}) - \min_j(a_{ij})} \right]; \mu_{ij}, v_{ij} \right),$$

standardizing respectively fuzzy numbers of the benefit-type decision parameters and the cost-type decision parameters in the fuzzy decision-making matrix;

wherein, $r_{ij}$ is an attribute value for a decision parameter in the standardized decision-making matrix obtained by standardizing decision parameters in the fuzzy decision matrix, $a_{ij}$, $b_{ij}$, $c_{ij}$, and $d_{ij}$ are attribute values of a decision parameter corresponding to an ith row and a jth column of the fuzzy decision-making matrix, $\mu_{ij}$ and $v_{ij}$ are respectively a membership degree corresponding to a membership function and a non-membership degree corresponding to a non-membership function of the fuzzy decision-making matrix, i represents an ith row of the fuzzy decision-making matrix, and j represents a jth column of the fuzzy decision-making matrix.

7. The method according to claim 5, wherein the formula of intuitionistic trapezoidal fuzzy weight averaging operator is:

$$ITFWA_\omega(\tilde{a}_{m1}, \tilde{a}_{m2}, \ldots \tilde{a}_{mn}) =$$
$$\sum_{k=1}^n \tilde{a}_{mk} \omega_k = \left( \left[ \sum_{k=1}^n a'_{mk} \omega_k, \sum_{k=1}^n b'_{mk} \omega_k, \sum_{k=1}^n c'_{mk} \omega_k, \right. \right.$$
$$\left. \left. \sum_{k=1}^n d'_{mk} \omega_k \right]; 1 - \prod_{k=1}^n (1 - \mu'_{mk})^{\omega_2} = \prod_{k=1}^n v'^{\omega_3}_{mk} \right)$$

wherein, $\omega = (\omega_1, \omega_2, \ldots, \omega_k)^T$ is the weight vector for each preset service type, $\omega_5 > 0$, $\Sigma_{k=1}^N \omega_k = 1$ $\omega_k$ represents a kth weight in the weight vector for each preset service type, n represents the number of the decision parameters, $a_{mk}'$, $b_{mk}'$, $c_{mk}'$, and $d_{mk}'$ are attribute values of a decision parameter corresponding to a mth row and a kth column of the standardized decision-making matrix, $\mu_{mk}'$ and $v_{mk}'$ are respectively a membership degree corresponding to a membership function and a non-membership degree value corresponding to a non-membership function of the standardized decision-making matrix, and $\tilde{a}$ represents intuitionistic trapezoidal fuzzy numbers.

8. The method according to claim 5, wherein the score function is:

$$S(\tilde{a}) = \frac{1}{4}(p+q+s+g) \times \frac{\mu\tilde{a} - \nu\tilde{a}}{2}$$

wherein, S($\tilde{a}$) is a score of a candidate network, p, q, s, and g are respectively average attribute values of decision parameters for preset service types, $\mu\bar{a}$ and $\nu\bar{a}$ are respectively a membership degree and non-membership degree value for the average attribute value of decision parameters for each preset service type, $\mu$, $\nu$ are respectively a membership degree and non-membership degree for the average attribute value of decision parameters for each preset service type, and $\bar{a}$ represents an intuitionistic trapezoidal fuzzy number.

9. The method according to claim 1, wherein the preset service types comprise: a conversational service, a streaming service, an interaction service, a background service, and a Machine-to-Machine (M2M) wireless communication service.

10. An apparatus for handover between heterogeneous networks, comprising:
a first obtaining module, configured for obtaining, for each of a plurality of candidate networks, parameters of the candidate network including a packet loss rate and a network load, and taking the obtained parameters as decision parameters of the candidate network;
a second obtaining module, configured for obtaining each of preset service types and a preset weight factor for at least one user preference corresponding to the preset service type;
a weight computation module, configured for calculating, for each preset service type, weights of decision parameters for the preset service type by using the decision parameters of the candidate network and through an Analytic Hierarchy Process, and determining a vector composed of the weights of decision parameters for each preset service type as a weight vector for the preset service type;
a weight adjusting module, configured for adjusting the weight vector for each preset service type by using the preset weight factor for at least one user preference corresponding to the preset service type;
a handover determination module, configured for calculating, using the weight vector for each preset service type and through an intuitionistic trapezoidal fuzzy multi-attribute decision- making algorithm, a score for each of the candidate networks, determining the candidate network with the highest score as a target network, and triggering a handover.

11. An electronic device, including a processor, a communication interface, a memory, and a communication bus, wherein the processor, the communication interface and the memory communicate with each other through the communication bus;
the memory is configured for storing a computer program; and
the processor is configured for implementing method steps when executing the computer program stored in the memory, the method steps comprising:
obtaining, for each of a plurality of candidate networks, parameters of the candidate network including a packet loss rate and a network load, and taking the obtained parameters as decision parameters of the candidate network;
obtaining each of preset service types and a preset weight factor for at least one user preference corresponding to the preset service type;
calculating, for each preset service type, weights of decision parameters for the preset service type by using the decision parameters of the candidate network and through an Analytic Hierarchy Process, and determining a vector composed of the weights of decision parameters for each preset service type as a weight vector for the preset service type;
adjusting the weight vector for each preset service type by using the preset weight factor for at least one user preference corresponding to the preset service type; and
calculating, using the weight vector for each preset service type and through an intuitionistic trapezoidal fuzzy multi-attribute decision-making algorithm, a score for each of the candidate networks, determining the candidate network with the highest score as a target network, and triggering a handover.

12. A non-transitory computer-readable storage medium, having stored thereon a computer program which, when executed by a processor, causes the processor to implement method steps, the method steps comprising:
obtaining, for each of a plurality of candidate networks, parameters of the candidate network including a packet loss rate and a network load, and taking the obtained parameters as decision parameters of the candidate network;
obtaining each of preset service types and a preset weight factor for at least one user preference corresponding to the preset service type;
calculating, for each preset service type, weights of decision parameters for the preset service type by using the decision parameters of the candidate network and through an Analytic Hierarchy Process, and determining a vector composed of the weights of decision parameters for each preset service type as a weight vector for the preset service type;
adjusting the weight vector for each preset service type by using the preset weight factor for at least one user preference corresponding to the preset service type; and
calculating, using the weight vector for each preset service type and through an intuitionistic trapezoidal fuzzy multi-attribute decision-making algorithm, a score for each of the candidate networks, determining the candidate network with the highest score as a target network, and triggering a handover.

* * * * *

UNITED STATES PATENT AND TRADEMARK OFFICE
CERTIFICATE OF CORRECTION

Page 1 of 3

PATENT NO. : 11,432,211 B2
APPLICATION NO. : 17/267717
DATED : August 30, 2022
INVENTOR(S) : Qixun Zhang et al.

It is certified that error appears in the above-identified patent and that said Letters Patent is hereby corrected as shown below:

On the Title Page

<u>Item (72) INVENTORS:</u>
"Zhiqing Wei, Bijing (CN);"
Should read:
--Zhiqing Wei, Beijing, (CN);--

In the Specification

<u>Column 17, Lines 48-56:</u>

$$ITFWA_\omega(\tilde{a}_{m1}, \tilde{a}_{m2}, \cdots \tilde{a}_{mn}) =$$

$$\sum_{k=1}^{n} \tilde{a}_{mk}\omega_k = \left(\left[\sum_{k=1}^{n} a'_{mk}\omega_k, \sum_{k=1}^{n} b'_{mk}\omega_k, \sum_{k=1}^{n} c'_{mk}\omega_k, \right.\right.$$

$$\left.\left.\sum_{k=1}^{n} d'_{mk}\omega_k\right]; 1 - \prod_{k=1}^{n}(1-\mu'_{mk})^{\omega_1} = \prod_{k=1}^{n} v'_{mk}{}^{\omega_1}\right)$$

"
Should read:

$$ITFWA_\omega(\tilde{a}_{m1}, \tilde{a}_{m2}, \cdots \tilde{a}_{mn}) = \sum_{k=1}^{n} \tilde{a}_{mk}\omega_k$$

$$= ([\sum_{k=1}^{n} a_{mk}'\omega_k, \sum_{k=1}^{n} b_{mk}'\omega_k, \sum_{k=1}^{n} c_{mk}'\omega_k, \sum_{k=1}^{n} d_{mk}'\omega_k]; 1 - \prod_{k=1}^{n}(1-\mu_{mk}')^{\omega_k}, \prod_{k=1}^{n} v_{mk}'{}^{\omega_k})$$

--

<u>Column 23, Lines 16-24:</u>

Signed and Sealed this
Twentieth Day of December, 2022

Katherine Kelly Vidal
*Director of the United States Patent and Trademark Office*

CERTIFICATE OF CORRECTION (continued)
U.S. Pat. No. 11,432,211 B2

"$ITFWA_\omega(\tilde{a}_{m1}, \tilde{a}_{m2}, \cdots \tilde{a}_{mn}) =$ $$\sum_{k=1}^{n} \tilde{a}_{mk} \omega_k = \left(\left[\sum_{k=1}^{n} a'_{mk}\omega_k, \sum_{k=1}^{n} b'_{mk}\omega_k, \sum_{k=1}^{n} c'_{mk}\omega_k,\right.\right.$$

$$\left.\left.\sum_{k=1}^{n} d'_{mk}\omega_k\right]; 1 - \prod_{k=1}^{n}(1 - \mu'_{mk})^{\omega_2} = \prod_{k=1}^{n} v'_{mk}{}^{\omega_3}\right)$$
"

Should read:

$$ITFWA_\omega(\tilde{a}_{m1}, \tilde{a}_{m2}, \cdots \tilde{a}_{mn}) = \sum_{k=1}^{n} \tilde{a}_{mk} \omega_k$$

$$= \left(\left[\sum_{k=1}^{n} a_{mk}'\omega_k, \sum_{k=1}^{n} b_{mk}'\omega_k, \sum_{k=1}^{n} c_{mk}'\omega_k, \sum_{k=1}^{n} d_{mk}'\omega_k\right]; 1 - \prod_{k=1}^{n}(1 - \mu_{mk}')^{\omega_k}, \prod_{k=1}^{n} \upsilon_{mk}'{}^{\omega_k}\right)$$

In the Claims

Column 27, Claim 3, Lines 3-5:

"$\omega_i = \overline{w_i} / \Sigma_{i=1}^{n} \overline{w_i}$"

Should read:

-- $\omega_i = \overline{w}_i / \sum_{i=1}^{n} \overline{w}_i$ --

Column 28, Claim 7, Lines 46-53:

"$ITFWA_\omega(\tilde{a}_{m1}, \tilde{a}_{m2}, \cdots \tilde{a}_{mn}) =$ $$\sum_{k=1}^{n} \tilde{a}_{mk} \omega_k = \left(\left[\sum_{k=1}^{n} a'_{mk}\omega_k, \sum_{k=1}^{n} b'_{mk}\omega_k, \sum_{k=1}^{n} c'_{mk}\omega_k,\right.\right.$$

$$\left.\left.\sum_{k=1}^{n} d'_{mk}\omega_k\right]; 1 - \prod_{k=1}^{n}(1 - \mu'_{mk})^{\omega_2} = \prod_{k=1}^{n} v'_{mk}{}^{\omega_3}\right)$$
"

The correct formula should read:

CERTIFICATE OF CORRECTION (continued)
U.S. Pat. No. 11,432,211 B2

$$\text{ITFWA}_\omega(\tilde{a}_{m1}, \tilde{a}_{m2}, \cdots \tilde{a}_{mn}) = \sum_{k=1}^{n} \tilde{a}_{mk}\omega_k$$

$$= ([\sum_{k=1}^{n} a_{mk}'\omega_k, \sum_{k=1}^{n} b_{mk}'\omega_k, \sum_{k=1}^{n} c_{mk}'\omega_k, \sum_{k=1}^{n} d_{mk}'\omega_k]; 1 - \prod_{k=1}^{n}(1-\mu_{mk}')^{\omega_k}, \prod_{k=1}^{n} \upsilon_{mk}'^{\omega_k})$$

Column 28, Claim 7, Line 56:
"$\omega_5 > 0$, $\Sigma_{k=1}^{N}\omega_k = 1$ $\omega_k$ represents"
Should read:
--$\omega_k > 0$, $\sum_{k=1}^{n}\omega_k = 1$ $\omega_k$ represents--